May 10, 1927.
A. W. WELLINGTON
1,627,943
ROCKING HANDLE FLUSH TANK FITTING
Filed Sept. 4, 1926
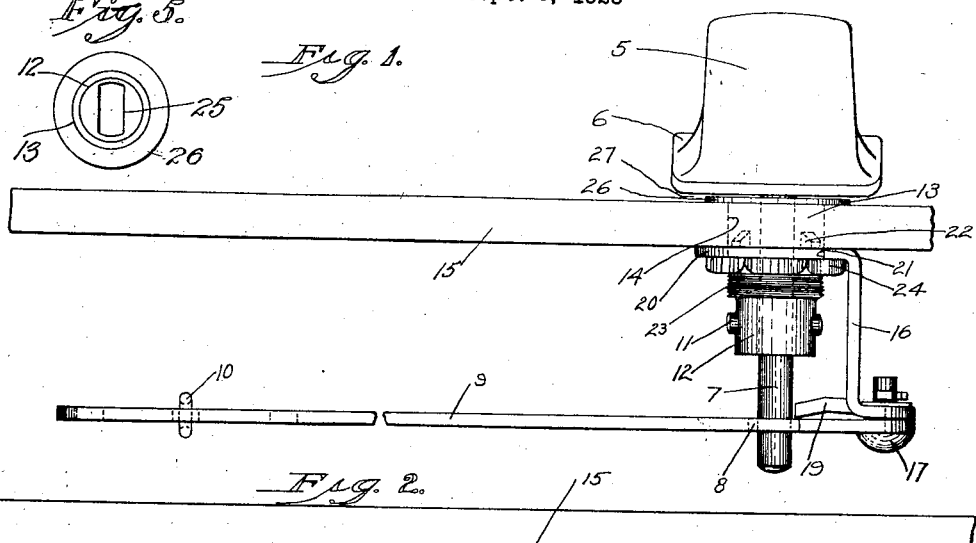
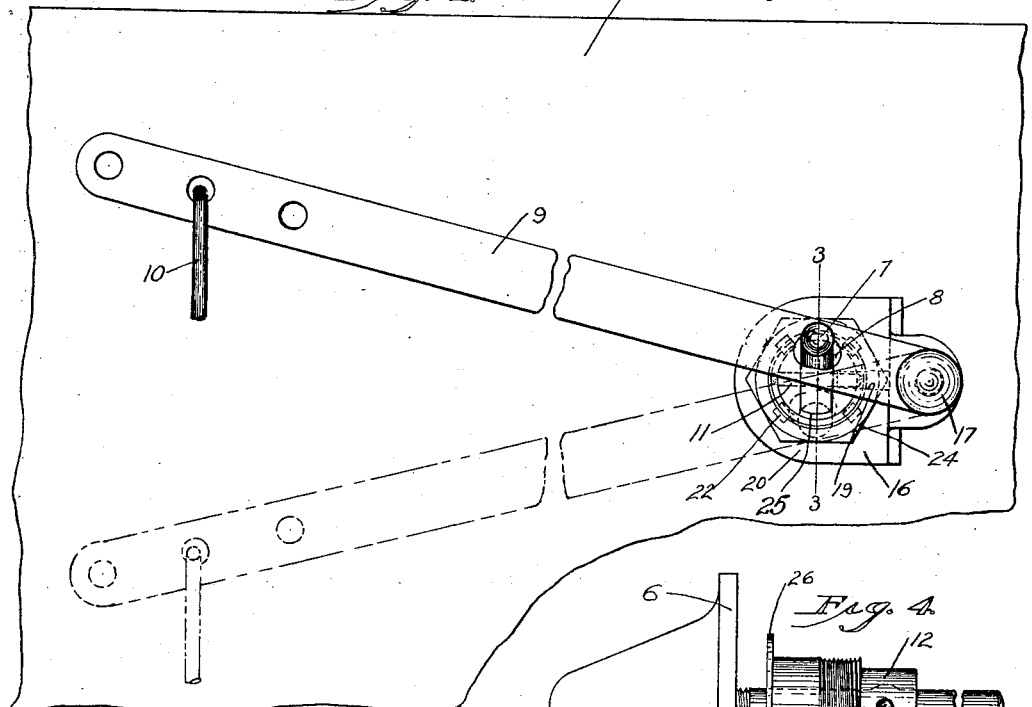
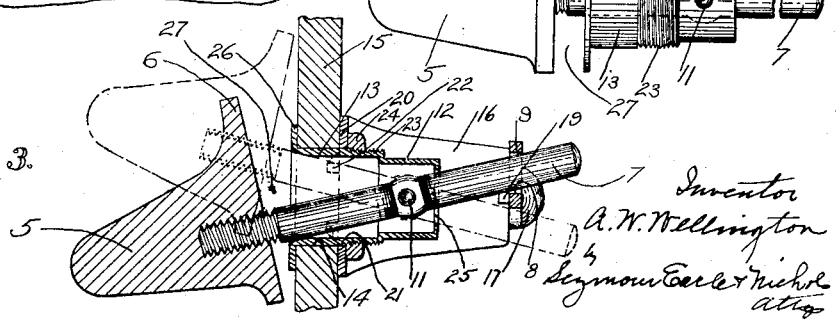

Patented May 10, 1927.

1,627,943

UNITED STATES PATENT OFFICE

ARTHUR W. WELLINGTON, OF WATERBURY, CONNECTICUT, ASSIGNOR TO THE CHASE COMPANIES INC., OF WATERBURY, CONNECTICUT, A CORPORATION.

ROCKING-HANDLE FLUSH-TANK FITTING.

Application filed September 4, 1926. Serial No. 133,563.

Fig. 1 is a broken plan view of my improved rocking-handle flush-tank fitting;

Fig. 2 is a broken view thereof in side elevation;

Fig. 3 is a view thereof in vertical section on the line 3—3 of Fig. 2; and

Fig. 4 is a detached view of the rocking-handle assembly.

Fig. 5 is a detached view in inside end elevation of the assembly-sleeve.

My invention relates to a rocking-handle flush-tank fitting, the object being to provide a simple, durable and dependable flush-tank fitting of the character described, constructed with particular reference to the convenient installation of the fitting by the plumber.

With these ends in view, my invention consists in a flush-tank fitting characterized by an assembly or unit comprising a threaded sleeve reduced in diameter at its inner end, an operating-shaft passing through the said sleeve, and a pin passing transversely through the reduced inner end of the sleeve and through the said shaft which rocks upon it and shorter in length than the full diameter of the sleeve.

My invention further consists in a flush-tank fitting characterized as above and having certain details of construction as will be hereinafter described and pointed out in the claims.

In carrying out my invention, as herein shown, I employ a handle made of porcelain, metal, or other suitable material and comprising a tapering projection 5, having a flat upper and lower face and a substantially square base 6, and fixed to the projecting outer end of an operating-shaft 7, the projecting inner end of which passes through a slot 8 in the inner end of the valve-lifting lever 9, the outer end of which carries a link 10 connected with the float-valve (not shown) of the tank, whereby the said handle is connected with the valve for the lifting thereof for flushing the closet-bowl. For rocking the said operating-shaft 7 in the vertical plane, it is pivotally mounted upon a horizontal pin 11 passing through the reduced inner end 12 of an assembly-sleeve 13 positioned in an opening 14, in the front wall 15 of the tank. The portion of the said sleeve projecting into the tank carries a metal bracket 16, the inner end of which carries a stud 17 on which the inner end of the valve-lifting lever 9 is pivotally mounted. A finger 19 offset from the bracket 16 prevents the inner displacement of the said lever 9. The base 20 of the bracket is formed with an opening 21, through which the sleeve passes, and with positioning-fingers 22 which enter the opening 14 in the wall 15 of the tank and prevent the bracket from turning upon the sleeve, which is threaded as at 23 for the reception of a nut 24, which forces the base of the bracket to a firm bearing upon the inner wall 15 of the tank. By reducing the inner end of the sleeve, as at 12, the nut 24 is freely slipped off and on over the sleeve, after the operating-shaft has been permanently assembled with the sleeve by the pin 11 which passes through the reduced end 12 of the sleeve and through the shaft 7 and which is shorter than the full diameter of the sleeve. The handle, the rocking operating-shaft, and the sleeve are supplied to the trade as a unit or assembly, greatly simplifying the number of parts to be assembled by the plumber or other user of the fitting. The said assembly or unit is supplied to the trade as such and installed in the tank as one piece, after which the nut 24 which holds the bracket 16 in place may be passed over the projecting inner end of the shaft and the reduced end 12 of the sleeve and over the pin 11 of the shaft and then screwed upon the threaded portion of the main body of the sleeve, this being made possible by reducing the sleeve in diameter as described and employing a short pin providing for the clearance of the nut.

As shown, the inner end of the sleeve is closed and formed with a vertical slot 25, the side-walls of which engage the operating-shaft 7 and prevent the lateral movement thereof. As shown, also, the outer end of the sleeve is furnished with a positioning-flange 26, which ensures a predetermined clearance-space 27 between the base 6 of the handle 5 and the front-wall 15 of the tank, and so limits the rocking movement of the handle.

I claim:

1. In a rocking-handle flush-tank fitting, the combination with an assembly-sleeve adapted to be mounted in a tank, having its inner end reduced in diameter and externally threaded adjacent to its said reduced portion, of an operating-shaft, pivoted on a horizontal pin passing through the reduced end of the sleeve and through the said shaft which rocks upon it and shorter than the full diameter of the sleeve, a handle carried by the projecting outer end of the said shaft, a nut applied to the threaded portion of the sleeve over the reduced end thereof and over the ends of the said pin, a bracket passed over the inner end of the said sleeve and held in place by the said nut, and a valve-lifting lever pivotally secured to the said bracket and connected with the inner end of the shaft for being lifted thereby.

2. In a rocking-handle flush-tank fitting, the combination with an assembly-sleeve adapted to be mounted in a tank and having its inner end reduced in diameter and formed with a vertical slot, of an operating-shaft pivoted within the said reduced end of the sleeve for rocking movement therein in the vertical plane, projecting at its ends therefrom and prevented from lateral displacement by the side-walls of the said slot, a handle carried by the outer end of the said shaft, and valve-lifting means connected with the said inner end thereof.

3. An assembly or unit for rocking-handle flush-tank fittings, consisting of a threaded sleeve having its inner end reduced in diameter, a shaft passing through the said sleeve, projecting at each end therefrom, and a pin passing through the reduced end of the sleeve and through the shaft which rocks upon it and shorter in length than the full diameter of the sleeve.

In testimony whereof, I have signed this specification.

ARTHUR W. WELLINGTON.